United States Patent
Heer et al.

(10) Patent No.: US 12,490,732 B2
(45) Date of Patent: Dec. 9, 2025

(54) CONTROL AND/OR REGULATING SYSTEM FOR AN AGRICULTURAL WORKING MACHINE

(71) Applicant: AMAZONEN-WERKE H. DREYER SE & CO. KG, Hasbergen (DE)

(72) Inventors: Jochen Heer, Osnabrueck (DE); Alexander Siltmann, Osnabrueck (DE); Bernd Becker, Stuttgart (DE); Michael Walter, Kornwestheim (DE)

(73) Assignee: AMAZONEN-WERKE H. DREYER SE & CO., Hasbergen (DE)

( * ) Notice: Subject to any disclaimer, the term of this patent is extended or adjusted under 35 U.S.C. 154(b) by 309 days.

(21) Appl. No.: 18/025,083

(22) PCT Filed: Sep. 7, 2021

(86) PCT No.: PCT/EP2021/074542
§ 371 (c)(1),
(2) Date: Mar. 7, 2023

(87) PCT Pub. No.: WO2022/053446
PCT Pub. Date: Mar. 17, 2022

(65) Prior Publication Data
US 2023/0320340 A1    Oct. 12, 2023

(30) Foreign Application Priority Data

Sep. 8, 2020    (DE) .......................... 102020123356.6

(51) Int. Cl.
*A01M 7/00*    (2006.01)
*A01B 76/00*    (2006.01)

(52) U.S. Cl.
CPC ........... *A01M 7/0089* (2013.01); *A01B 76/00* (2013.01)

(58) Field of Classification Search
CPC ............................ A01M 7/0089; A01B 76/00
(Continued)

(56) References Cited

U.S. PATENT DOCUMENTS

2013/0292487 A1* 11/2013 Ballu .................. A01M 7/0042
239/71
2016/0227755 A1    8/2016 Preheim et al.
(Continued)

FOREIGN PATENT DOCUMENTS

DE    102006038688 A1    2/2008
DE    102010061241 A1    6/2012
(Continued)

OTHER PUBLICATIONS

Nedelec, Morgan, Examiner, "International Search Report", including English Translation of ISR, mailed Dec. 22, 2021, issued in corresponding PCT Application No. PCT/EP2021/074542, Sep. 7, 2021.
(Continued)

*Primary Examiner* — Manglesh M Patel
(74) *Attorney, Agent, or Firm* — PERRY + CURRIER INC.

(57) ABSTRACT

A control or regulating system for an agricultural working machine is provided, the system comprising a plurality of actuating elements that can be controlled individually or in groups, at least one control unit for receiving and/or sending switching commands to control the actuating elements, wherein the switching commands have at least one setting parameter setting and/or configuring the actuating elements, and at least one signal line to connect at least two actuating elements to the control unit for signal transmission. The switching commands are combined into at least one common group switching command that is transmitted via the at least one signal line, and the actuating elements are set (Continued)

and/or configured by the at least one group switching command. In turn, the efficiency and dependability of previous control or regulating systems is improved in a simple manner.

16 Claims, 9 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 2017/0348718 A1* | 12/2017 | Preheim | ............... | A01C 23/007 |
| 2020/0045953 A1* | 2/2020 | Serrat | ................. | A01M 7/0042 |
| 2021/0105993 A1* | 4/2021 | Hirthammer | ........ | A01C 23/047 |
| 2021/0127567 A1* | 5/2021 | Loukili | ............... | A01M 7/0042 |
| 2022/0053685 A1* | 2/2022 | Maro | ................... | A01B 63/008 |
| 2022/0110238 A1* | 4/2022 | Vandike | ............... | G05D 1/0278 |
| 2022/0192175 A1* | 6/2022 | Humpal | .................... | G06T 7/70 |
| 2022/0202002 A1* | 6/2022 | Schmitz | ............... | A01M 7/0089 |
| 2022/0202003 A1* | 6/2022 | Schmitz | .................... | B60Q 9/00 |
| 2024/0212342 A1* | 6/2024 | Srinivasan | ........... | G06V 20/188 |
| 2024/0292826 A1* | 9/2024 | Kwak | ................. | A01M 7/0042 |
| 2024/0329837 A1* | 10/2024 | Cooper | ................. | G06F 3/0608 |

FOREIGN PATENT DOCUMENTS

| | | |
|---|---|---|
| DE | 102016216495 A1 | 3/2018 |
| EP | 2995382 A1 | 3/2016 |

OTHER PUBLICATIONS

Search Report dated Jul. 1, 2021 issued in corresponding German Patent Application No. 102020123356.6, filed Sep. 8, 2020.

* cited by examiner

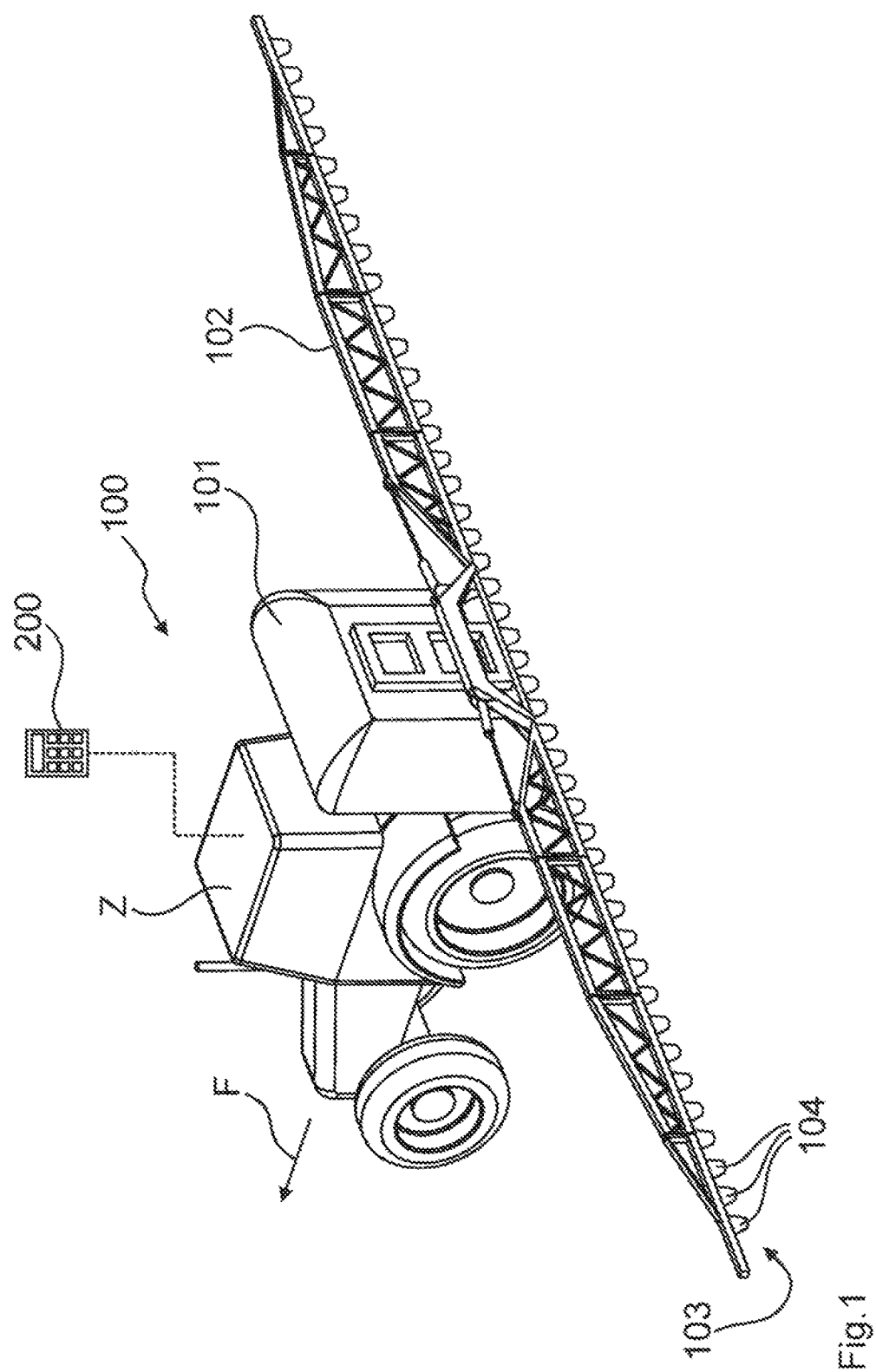

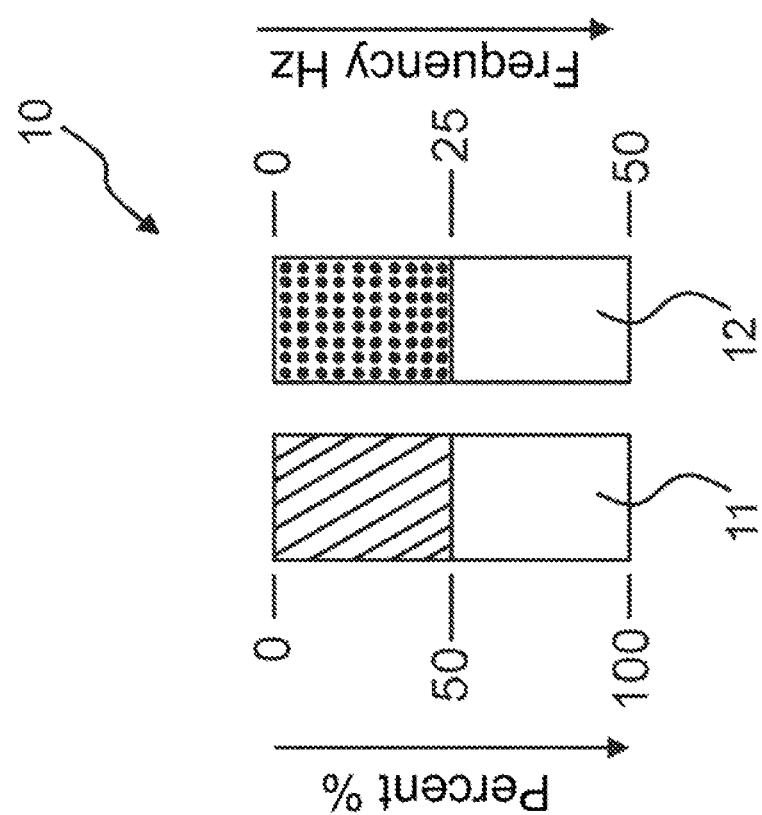

CONTROL AND/OR REGULATING SYSTEM FOR AN AGRICULTURAL WORKING MACHINE

The invention relates to a control and/or regulating system for an agricultural working machine according to the preamble of claim 1, an agricultural working machine having a control and/or regulating system according to the preamble of claim 9, and a method for operating an agricultural working machine having a control and/or regulating system according to the preamble of claim 12.

Working machines for treating and/or processing agricultural areas are used in a large number of applications within agriculture. In this case, such working machines can be carried and/or pulled by a tractor, or be designed to be self-propelled.

Such working machines include, for example, distributing machines which serve to spread solid—in particular, granular—and/or liquid material. These include, inter alia, seed and/or fertilizer machines for depositing seed and/or fertilizer, or field syringes for applying spraying agents, e.g., weed control agents, crop protection agents, and/or fertilizers. In addition to distributing machines, soil cultivation machines and/or plant treatment devices—in particular, hoeing devices—are also included under such agricultural working machines.

In order to achieve a high efficiency of working machines despite the large dimensions of agricultural areas, said machines usually have particularly large working widths having a plurality or multiplicity of actuating elements—in particular, actuators—which are assigned to individual working means, e.g., driven tools, separating and/or metering devices, valves, and/or spray nozzles. In this case, in particular row-based arrangements of such working means have become established, which are arranged in and/or transversely to a direction of travel on the working machine—in particular, next to one another.

In addition, modern agricultural working machines have a control and/or regulating system assigned to the working machine, which enables the user to control and/or regulate the actuating elements in a manner as required and/or which is at least partially automated. In particular, the particularly high working speeds and/or the partial-surface-specific—in particular, at least almost punctiform—application of material and/or processing of the surface in this case requires a particularly fast-acting control and/or regulating system.

Such a control and/or regulating system is described in EP 2 995 382 A1. The control and/or regulating system disclosed here comprises, in addition to a plurality of actuating elements which can be controlled individually and/or in groups, at least one control unit associated with the actuating elements, which control unit is designed to receive and/or send switching commands for controlling the actuating elements. In this case, the switching commands have at least one setting parameter suitable for setting and/or configuring the actuating elements. Furthermore, the control and/or regulating system comprises at least one signal line via which the at least two actuating elements are connected to the control unit.

A disadvantage of this design is, among other things, that the switching commands can be sent, received, and/or transmitted individually—in particular, sequentially—for the respective actuating elements to be controlled. This in turn results in a particularly high throughput of switching commands through the at least one signal line when settings and/or parameters of individual actuating elements are to be adjusted to the demand of the agricultural area and/or the environmental conditions—in particular, to the driving speed of the working machine. In particular, a dynamic adjustment of the application rate of spraying agent by means of a field sprayer, e.g., when entering or exiting and/or during cornering, is problematic in this case. In this case, the quantity of spraying agent to be applied along the curve radius can vary particularly greatly from the curve center point in the radial direction, and in particular due to travel speed and/or travel angle changes. Thus, for example, at least almost no spraying medium is to be spread by means of an actuating element—in particular, a spray nozzle—which faces the curve center along the working width, and a maximum achievable amount of the spraying medium is to be spread by means of an actuating element—in particular, a spray nozzle—which faces away from the curve center along the working width. In this case, the particularly high degree of adjustment and/or the adjustment frequency along the plurality of actuating elements lead to a particularly high number of switching commands to be transmitted. Particularly on account of, on the one hand, the bandwidth, which is available in a limited manner—in particular, the data fields and/or bit time—of the control and/or regulating system, and, on the other, the high number of actuating elements due to the working width, previous control and/or regulating systems are particularly complex in design. Furthermore, such large quantities of switching commands can lead to data and/or switching command losses and thus negatively influence the control and/or regulation process of the spreading and/or processing procedure, at least in part.

A further disadvantage of the limited available bandwidth is that the transmission speed of the switching commands—in particular, the bit time—is at least partially delayed, and in particular increased, due to the particularly high throughput. Thus, in particular at least almost punctiform spreading, metering, and/or processing procedures can be disturbed at least in part, and the spreading and/or processing accuracy can be impaired, at least in part.

The object of the invention is therefore to design a control and/or regulating system for an agricultural working machine in such a way that the efficiency and/or operational safety of previous control and/or regulating systems—in particular, during the transmission of switching commands—is increased in a particularly simple manner.

This object is achieved according to the invention in that the switching commands can be combined to form at least one common group switching command that can be transmitted via the at least one signal line, and in that the actuating elements can be set and/or configured by means of the at least one group switching command.

As a result of this measure, in addition to at least one actuating element, a plurality of—in particular, at least two—actuating elements can also be set and/or configured by means of the at least one group switching command. The control and/or regulating system preferably comprises at least one computer unit associated with the at least one control unit and configured to generate the group switching commands and to transmit them to the at least one control unit. Alternatively or additionally, the computer unit can be arranged on and/or within the at least one control unit. Furthermore, the at least one control unit is preferably designed to control and/or to regulate—in particular, to set and/or configure—at least one actuating element, and preferably several actuating elements, as a function of and/or by means of the at least one group switching command. Any forms of control variables of the at least one actuating element can preferably be influenced by means of the group switching commands—in particular, the setting parameters.

In this case, a control variable can, for example, be a degree of opening or closing, a rotational speed and/or frequencies, stroke height and/or stroke length, temperature, brightness, position information, or the like. In this case, a group switching command can comprise at least one setting parameter assigned to a respective control variable, or a plurality of setting parameters for different control variables. This embodiment offers the significant advantage that the number of switching commands and/or group switching commands to be transmitted is at least substantially reduced.

Particularly preferably, the group switching commands can be generated as a function of control variables that can be predetermined by the control and/or regulating system and/or control variables that can be calculated and/or retrieved by the control and/or regulating system. Furthermore, the control variables can preferably be determined as a function of a target and/or dependent variable required for processing and/or treatment of the agricultural area. In this case, a target and/or dependent variable can represent, for example, a required force, a pressure, and/or an amount.

Alternatively or additionally, the actuating elements can also be designed as sensor units for detecting control variables and/or environmental information, wherein the detected control variables and/or environmental information are able to be transmitted at least in part by means of the group switching commands.

The at least one signal line is preferably designed so as to be at least in part wired and/or wireless—in particular, radio-based. In addition to conventional signal-conducting cable types, optical fiber lines—in particular, for at least almost real-time transmissions—are also conceivable in the case of wired transmission. Furthermore, a wireless signal line can be designed, for example, as a WLAN, Bluetooth, infrared connection, etc.

In a preferred embodiment of the control and/or regulating system according to the invention, the control and/or regulating system is designed at least in part as a bus system, and in particular a CAN bus system. The number of signal lines required to and/or from the at least one control unit and/or the actuating elements can be reduced yet further by a control and/or regulating system designed at least in part as a bus system. A further advantage of such control and/or regulating systems results from the transmission speed, and in particular the bit time, of the switching commands and/or group switching commands, which is comparatively superior to conventional networks. Alternatively or additionally, the bus system can be designed at least in part as a CAN FD or Flexible Data Rate Bus, in order to achieve an even further increased transmission speed. Furthermore, alternatively or additionally, further, preferably digital, data processing and/or transmission systems, such as Ethernet, are also conceivable.

In a preferred development of the control and/or regulating system according to the invention, the group switching command comprises at least one first and/or second identifier associated with the respective actuating elements, wherein at least one actuating element having an identifier matching the first and/or second identifier or lying therebetween is settable and/or configurable using the at least one group switching command—in particular, setting parameters. According to the invention, the identifier represents a preferably unique addressing, e.g., a network or IP address, of at least one actuating element. According to the invention, the first and/or second identifiers within at least one group switching command can correspond to one another or differ from one another, such that, for example, one actuating element or several actuating elements can be set and/or configured by means of the at least one group switching command. Furthermore, at least one actuating element which has an identifier that, in its sequence, is preferably also settable and/or configurable by means of the group switching command. In the context of adjacent actuating elements, the respective identifiers are preferably designed so as to be ascending or descending with respect to one another, at least in part, such that, in the case of a group switching command having a first and second identifier, mutually adjacent actuating elements are settable and/or configurable. The embodiment has the advantage that a larger number of actuating elements can be controlled and/or configured by means of the group switching command than the number of identifiers stored within the group switching command. Thus, the number of group switching commands, and in particular the throughput of data quantities, can be further reduced.

In another preferred embodiment of the control and/or regulating system according to the invention, the group switching command comprises at least one setting parameter having a start and/or end value, wherein at least one actuating element having the first and/or second identifier is settable and/or configurable using the start value and/or end value. In this case, the start and/or end value comprises the specifications and/or information necessary for setting and/or configuring the respective actuating elements, based upon and/or as a function of which the at least one control variable of at least one actuating element, and preferably several actuating elements, can be influenced. In this case, the start value can differ from the end value or correspond thereto. Thus, at least one actuating element, and in particular at least one control variable, e.g., a control and/or regulating range, can be predetermined by means of mutually differing values. Alternatively or additionally, the group switching command can comprise at least one setting parameter having a respective start and end value, and at least one further setting parameter having a start or end value.

In another development of the control and/or regulating system according to the invention, at least one group switching command provided for at least two actuating elements comprises at least one setting parameter having a start and end value, wherein the actuating element having the first identifier is settable and/or configurable using the start value, and the actuating element having the second identifier is settable and/or configurable using the end value. In the case of a setting parameter having the same start and end values, the at least two actuating elements, and in particular their respective control variables, are set and/or configured at least almost identically. In the case of different start and end values, the at least two actuating elements, and in particular their respective control variables, are set and/or configured differently, at least in part. A different value, in each case, for at least one control variable can thus, by means of at least one group switching command, be predetermined for several control variables.

In a further preferred embodiment of the control and/or regulating system according to the invention, at least one actuating element having an identifier lying between the first and second identifier is settable and/or configurable using at least one intermediate value lying between the start and end values. Preferably, the intermediate value can be determined, and in particular calculated, as a function of the start and/or end value, by means of the at least one computer unit and/or control unit. Alternatively or additionally, it is conceivable that the group switching command comprise at least one intermediate value associated with a respective actuating element and/or a control variable, which intermediate value can preferably be retrieved by the at least one control unit and/or the at least one actuating element. By means of such an embodiment, it is achieved that, in the case of a particularly small number of group switching commands to be transmitted, an at least virtually individual, and in particular punctiform, control and/or configuration of a plurality of actuating elements can be achieved.

In a further development of the control and/or regulating system according to the invention, the actuating elements can be controlled in the manner of a pulse width modulation and/or pulse width frequency modulation. Preferably, the at least one actuating element can be controlled and/or regulated via a technical variable, e.g., electrical voltage and/or current strength, wherein the magnitude of the technical variable is able to be modulated in a known manner, at least in part, and in particular adjustable between at least two values. Depending upon the embodiment, furthermore, the frequency with which the technical variable can be modulated, and in particular adjusted, can be constant or variable. Particularly preferably, the at least one group switching command comprises at least one setting parameter for influencing the pulse width or the duty cycle, and/or the pulse frequency. Furthermore, it is preferred that the control unit be designed to control and/or regulate at least one actuating element, and preferably a plurality of actuating elements, as a function of the settable pulse width and/or pulse frequency. Particularly preferably, the pulse width or the duty cycle can be predetermined in a percentage-wise manner—in particular, based upon the pulse frequency or cycle duration.

Furthermore, a control and/or regulating system according to the invention is preferred in which the at least one group switching command—in particular, setting parameter—comprises at least one pulse width and/or pulse frequency, and in particular several pulse widths and/or pulse frequencies. Particularly preferably, the at least one setting parameter has a first pulse width or pulse frequency as the start value, and a second pulse width or pulse frequency as the end value. In particular, in this case, the start value can be equal to the end value or differ from the end value.

The object of the invention is further achieved within an agricultural working machine having a control and/or regulating system of the type mentioned at the outset, wherein the control and/or regulating system is designed according to at least one of the above-described embodiments. With regard to the advantages and modifications of the agricultural working machine according to the invention, reference is first made to the advantages and modifications of the control and/or regulating system according to the invention.

In a preferred embodiment, the working machine is designed as a drawn, carried, and/or self-propelled field sprayer for spreading spraying medium. In this case, in addition to at least one storage container serving to store the spraying agent, the field sprayer comprises a linkage extending transversely to a direction of travel. In addition, the field sprayer comprises several actuating elements which are designed, for spreading the spraying medium, as spray nozzles arranged on the linkage, and/or valves—in particular, solenoid valves—associated with the spray nozzles. In this case, the spraying medium, proceeding from the at least one storage container, can be supplied to the valves and/or spray nozzles in settable quantities and/or at settable pressure, by means of a conveying system. Preferably, the spray nozzles are designed as single or multiple nozzle bodies, having a valve associated therewith and/or arranged thereon. Furthermore, at least one valve is also conceivable, which is associated with several spray nozzles.

In a particularly preferred embodiment of the working machine according to the invention, the amount of spraying agent discharged via at least one spray nozzle and/or a valve can be set individually—in particular, in a partial-surface-specific manner—wherein the group switching command comprises at least one setting parameter which influences the pressure and/or the amount of the spraying agent.

Furthermore, a preferred alternative embodiment is conceivable in which the working machine is designed as a towed, supported, and/or self-propelled plant treatment device—in particular, a hoeing device—having a control and/or regulating system according to the invention. In this case, the plant treatment device—in particular, the hoeing device—preferably comprises several working means, which are in particular drivable, can engage in the agricultural soil at least in part, and/or can be brought into contact with the plant stock—in particular, hoeing tools—with which at least one actuating element is associated.

In addition, in an alternative embodiment, a working machine designed at least in part as a sowing machine is preferred. In this case, the working machine comprises several row units and/or conveying lines, and in each case at least one actuating element associated with the row units and/or conveying lines. In this case, the row units and/or conveying lines are designed to deposit granular material—in particular, at presettable mutual spacings—on the agricultural area.

The object of the invention is further achieved by a method for operating an agricultural working machine having a control and/or regulating system, wherein the agricultural working machine and/or the control and/or regulating system is designed according to at least one of the above-described embodiments. With regard to the advantages and modifications of the method according to the invention, reference is first made to the advantages and modifications of the agricultural working machine and/or the control and/or regulating system according to the invention.

In a particularly preferred development of the method according to the invention, several switching commands provided for at least one actuating element are combined to form at least one common group switching command. Preferably, several switching commands provided for different actuating elements are combined to form at least one group switching command—in particular, by means of the at least one computer unit and/or control unit. In particular, the at least one group switching command provided for at least one actuating element is generated and/or retrieved. In this case, the retrieval and/or generation of the at least one group switching command is preferably carried out by means of the computer unit and/or control unit. Alternatively and/or additionally, the at least one group switching command can also be retrieved by the respective actuating element—in particular, by means of a control unit associated therewith. Preferably, the at least one group switching command is transmitted and/or received by means of the at least one control unit. Particularly preferably, at least one setting and/or a parameter of at least one actuating element—preferably several actuating elements—is adjusted using the at least one group switching command.

In a further particularly preferred embodiment of the method according to the invention, a group switching command having at least one first and/or second identifier is generated and/or retrieved, wherein the identifiers are associated with at least one of the actuating elements. If the first and second identifiers are executed identically, the group switching command is associated with only one actuating element or with several actuating elements having a matching identifier. Preferably, at least one setting and/or a parameter of at least one actuating element, the identifier of which matches the first and/or second identifier or the identifier of which is between the first and second identifiers, are adjusted.

In a further particularly preferred development of the method according to the invention, a group switching command having at least one setting parameter is generated and/or retrieved, wherein the at least one setting parameter comprises a start value and an end value. In particular, at least one setting or a parameter of at least one actuating element is adjusted using the start value, wherein the identifier of the at least one actuating element matches the first identifier. Particularly preferably, at least one setting or a parameter of at least one actuating element is adjusted using the end value, wherein the identifier of the at least one actuating element matches the second identifier.

In a further advantageous embodiment of the method according to the invention, a group switching command having at least one setting parameter is generated and/or retrieved, wherein the at least one setting parameter comprises at least one intermediate value between the start value and the end value. Preferably, at least one setting and/or a parameter of at least one actuating element is adjusted using the at least one intermediate value, wherein the identifier of the at least one actuating element lies between the first and second identifiers.

In a further advantageous development of the method according to the invention, the at least one intermediate value is calculated and/or generated by means of interpolation between the start value and the end value. In this case, the interpolation can preferably be designed as a linear, a nearest-neighbor, a square, or a cubic interpolation. Preferably, the control unit associated with at least one actuating element calculates the at least one intermediate value—in particular, between the start and end values.

In another preferred embodiment of the method according to the invention, several actuating elements, the respective identifiers of which are between the first and second identifiers, are each set and/or configured using an intermediate value that, proceeding from the start value, is ascending or descending. In this case, the actuating element having the first identifier—in particular, the at least one setting and/or a parameter thereof, is preferably adjusted by means of the start value, wherein the at least one first actuating element adjacent thereto is adjusted to a first intermediate value, and a further actuating element adjacent thereto—in particular, the at least one setting and/or parameter thereof, is adjusted by a further intermediate value. In this case, the intermediate values are associated with the respective—in particular, adjacent—actuating elements—in particular, as a function of the interpolation—ascending or descending from the start value.

In a particularly preferred embodiment, the at least one setting and/or the at least one parameter of an actuating element is maintained after an adjustment until it is adjusted by at least one further group switching command. Alternatively or additionally, a temporal limitation within the one setting and/or a parameter is also conceivable for this purpose.

Further details of the invention can be found in the example description and the drawings. In the drawings:

FIG. 1 is a perspective view from the rear of an agricultural field sprayer;

FIG. 2b is an enlarged view of a visualization of adjusted settings and/or configurations of an actuating element;

Figure 2A:
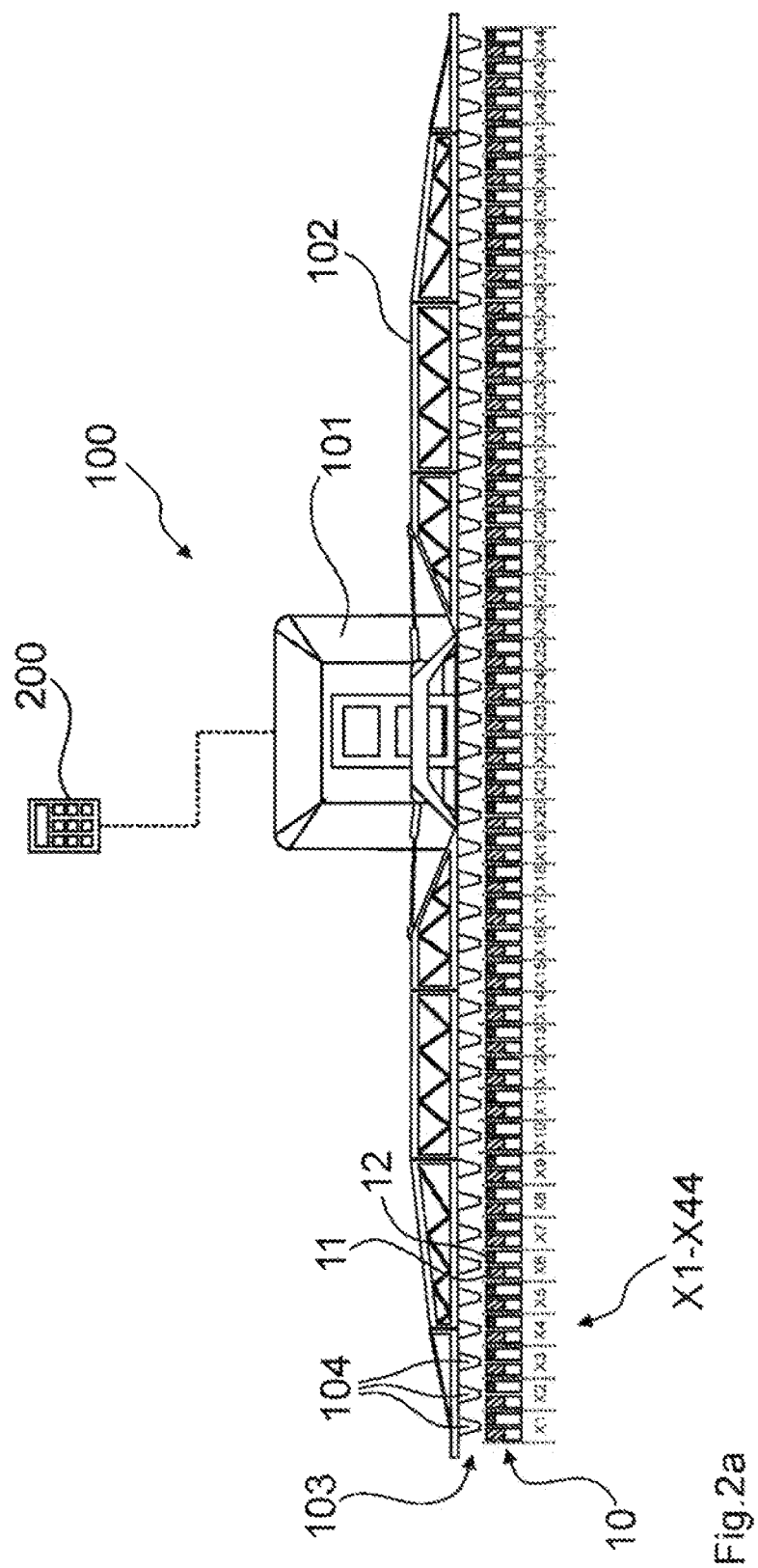
FIG. 2a is a first schematic view from the rear of the agricultural field sprayer, having an original setting and/or configuration of the actuating elements.

An agricultural working machine 100 designed as a distributing machine—in particular, as a field sprayer carried by a tractor Z—having a control and/or regulating system 200 associated therewith, is shown in FIG. 1. Alternatively to the embodiment shown, the working machine 100 can also be designed as a drawn and/or self-propelled distribution machine—in particular, a sowing and/or fertilizer machine, soil cultivation machine, and/or as a carried, drawn, and/or self-propelled plant treatment device—in particular, a hoeing device.

The working machine 100 is designed to spread and/or apply material—in particular, in the form of a weed control agent, crop protection agent, and/or fertilizer—via several actuating elements 103, onto an agricultural area and/or its plant stock. The working machine 100 shown by way of example comprises, in addition to a storage container 101, which serves to store the material—in particular, the spraying medium—a conveyor system (not shown in the figures). By means of the conveyor system, the material—in particular, spraying medium—can be supplied to the several actuating elements 103 in adjustable amounts and/or at an adjustable pressure, proceeding from the storage container 101. In this case, the actuating elements 103 are designed as spray nozzles 104 which are arranged on a linkage 102 that can be folded out transversely to a direction of travel F of the working machine 100, and/or as valves—in particular, solenoid valves—associated with the spray nozzles 104.

In the alternative embodiments of the agricultural working machine 100 according to the invention, the actuating elements 104 can also be designed as actuators which are associated with individual working means, e.g., driven tools, separating and/or metering devices, valves, and/or spray nozzles. In this case, the working means can also, alternatively or additionally, be arranged next to one another on the working machine 100 in rows—in particular, in and/or transversely to the direction of travel F.

The control and/or regulating system 200, which is likewise shown in FIG. 1 and is designed as a bus system—in particular, CAN bus system—comprises, for controlling the plurality of actuating elements 103, at least one control unit (not shown) which is designed to receive and/or send switching commands which can in particular be retrieved and/or generated by a computer unit associated with the control unit. For this purpose, the control and/or regulating system 200 has signal lines via which the control unit is connected to the computer unit and/or the actuating elements 103 in a signal-transmitting manner. Alternatively or additionally, the control and/or regulating system 200 can in this case also be designed at least in part as an Ethernet network and/or to have wireless signal transmission. In this case, the transmittable switching commands comprise one or more setting parameters 22, 23 which are suitable for the setting and/or configuration of the actuating elements 103 and by means of which the plurality of actuating elements 103 can be controlled individually and/or in groups by the control and/or regulating system 200—in particular, by the control unit.

FIG. 2a shows the actuating elements 103—in particular, spray nozzles 104—arranged side-by-side, in an original setting and/or original configuration by way of example, schematically showing the respective adjusted settings and/or parameters. By means of the settings and/or parameters of an actuating element 103, a respective control variable, dependent upon the type of actuating element 103, can be influenced, wherein, in this embodiment, the control variable represents a degree of opening of the actuating element 103—in particular, of the spray nozzle 104 and/or the valve associated therewith—which influences a spreading amount and/or application amount of the material—in particular, the spraying medium. In an alternative embodiment to that shown, the control variable can also represent, for example, a speed, frequency, stroke height and/or stroke length, temperature, brightness, and/or a position specification.

In the case of actuating elements 103, which can be controlled as in the embodiment shown in the manner of pulse width modulation and/or pulse width frequency modulation, it is expedient to set the control variable—in particular, the degree of opening—via the adjustment of the respective pulse width 22a, 22b and/or pulse frequency 23a, 23b. Thus, in this embodiment, a spreading and/or application amount of the material—in particular, the spraying medium—can be adjusted by means of two different setting parameters 22, 23 in each case. As an alternative to this embodiment, it can also be conceivable to adjust the spreading and/or application amount via only one setting parameter 22, 23 or using more than two setting parameters 22, 23.

In this case, the adjusted setting parameters 11, 12 of the actuating elements 103 are shown via a visualization 10 of the adjusted settings and parameters—in particular, two bars 11, 12 associated with each actuating element 103 and arranged underneath in the figures. FIG. 2b is an enlarged view showing the visualization 10 of an actuating element 103. In this case, the visualization 10 comprises two bars 11, 12 associated with one actuating element 103. In this case, the left-hand bar 11 represents the magnitude of the pulse width—in particular, of the duty cycle—while the right-hand bar 12 represents the height in Hz of the pulse frequency of an actuating element 103—in particular, a spray nozzle 104 and/or a valve. In this case, the pulse width 11 is settable, by way of example, from 0% (permanently closed) to 100% (permanently open). The pulse frequency 12 can be set between 0 Hz and 50 Hz.

Alternatively to the embodiment shown, the respective bars can also represent the magnitude or height of other types of setting parameters 22, 23, e.g., electrical voltages or electrical current strengths.

Figure 2C:
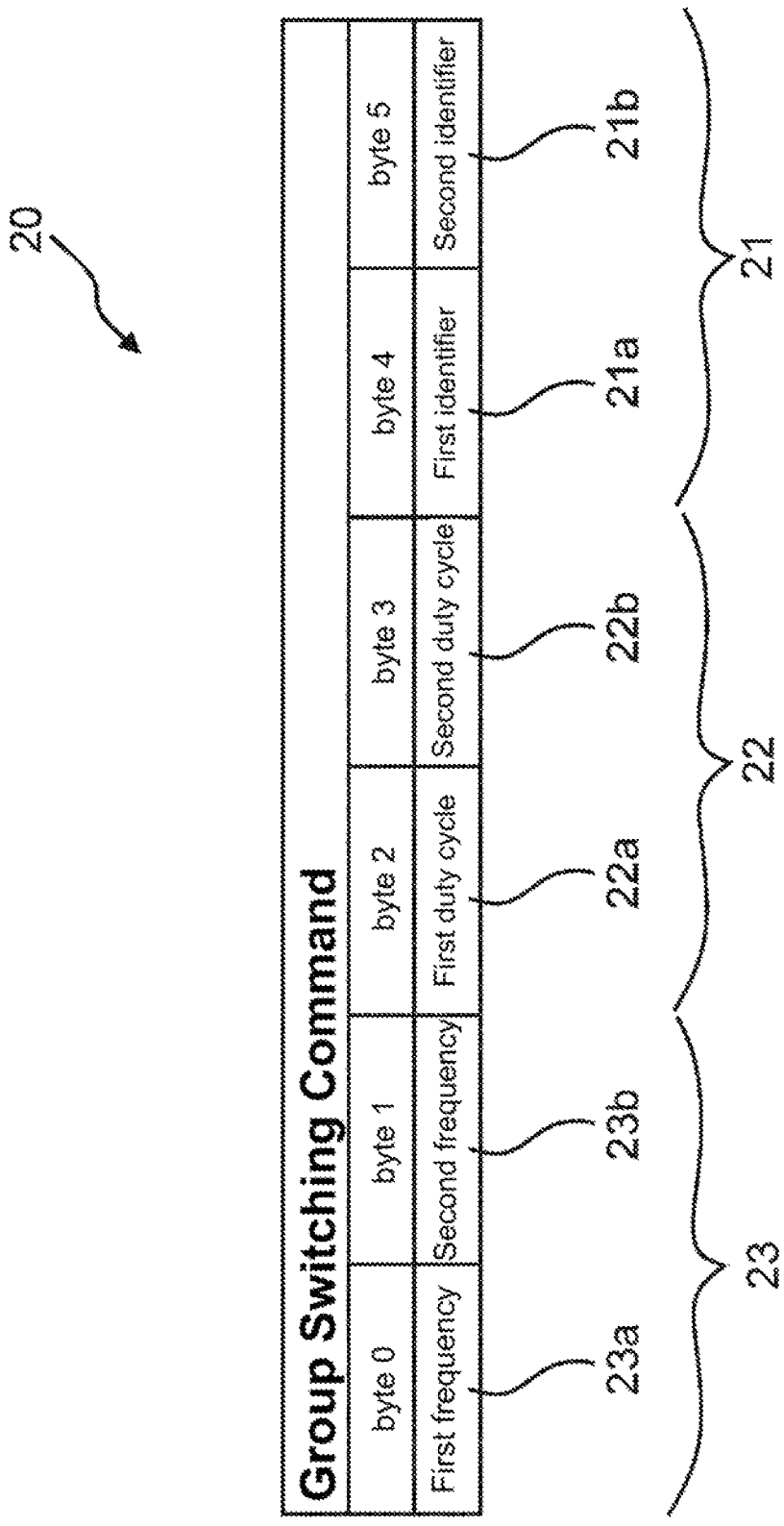
FIG. 2c is an enlarged view of a group switching command according to the invention.

According to the invention, for the purpose of setting and/or configuring the actuating elements 103, the respective switching commands, which are provided in particular for one actuating element 103 in each case and can be transmitted via the signal line, are combined and/or transmitted within the control and/or regulating system 200 to form a common group switching command 20, as shown in FIG. 2c. The group switching command 20, shown here by way of example, comprises six different bytes (byte 0-byte 5), wherein each byte has a start value 22a, 23a or end value 22b, 23b of a setting parameter 22, 23, or an identifier 21a, 21b or addressing associated with the actuating elements 103.

Alternatively to the group switching command 20 shown, other associations of the setting parameters 22, 23 with the bytes are also conceivable. Furthermore, it is conceivable that at least one byte comprise several setting parameters 22, 23 or, in addition to at least one start value 22a, 23a, also at least one end value 23a, 23b. In addition to the subdivision of the setting parameters 22, 23—in particular, the start 22a, 23a and/or end values 22b, 23b—into different bytes, a subdivision into individual or multiple bits—in particular, within at least one byte—is also conceivable. Furthermore, in addition to several setting parameters 22, 23, the group switching command 20 can alternatively also comprise only a single setting parameter 22, 23—in particular, a start value 22a, 23a or end value 22b, 23b.

In the embodiment shown here, a first identifier 21a or a start identifier is associated with the byte 4, and a second identifier 21b or end identifier is associated with the byte 5. If the identifier X1-X44 of an actuating element 103 matches the first and/or second identifier 21a, 21b of a group switching command 20, or, in the case of mutually different identifiers 21a, 21b within the group switching command 20, is located between the identifiers 21a, 21b, the control unit controls and/or sets the respective actuating element 103 and/or the respective control variable as a function of the setting parameters 22, 23. The first identifier 21a within the group switching command 20 can be identical to or different from the second identifier 21b. In the case of identical identifiers 21a, 21b, for example, either only one actuating element 103 or several actuating elements 103 having an identifier X1-X44 corresponding thereto is set and/or configured. In the case of different identifiers 21a, 21b within the group switching command 20, several actuating elements 103 having identifiers X1-X44 differing from one another are set and/or configured using the respective setting parameter 22, 23 of the group switching command 20.

Alternatively or additionally, the group switching command 20 can comprise at least one further—in particular, a superordinate or subordinate—identifier, by means of which the group switching command 20 can be associated, by the control and/or regulating system 200, with a group of—in particular, at least two—actuating elements 103. For example, in the case of several groups of actuating elements 103, the respective groups can be associated with different portions of the linkage 102, storage containers 101, and/or fluid circuits. Furthermore, the at least one further identifier can be associated with at least one further—in particular, superordinate or subordinate—control unit, which in turn is associated with at least one group of actuating elements 103.

The bytes 0-3 are associated with the respective start values 22a, 23b and end values 22b, 23b of a first setting parameter 22 and a second setting parameter 23. In this case, the first setting parameter 22, designed as a pulse width or as a duty cycle 22a, 22b in this embodiment, is divided into a start value or first duty cycle 22a and second duty cycle 22b, while the second setting parameter 23, designed as a pulse frequency 23a, 23b, is divided into a start value or a first pulse frequency 23a and an end value or a second pulse frequency 23b. If the respective start values 22a, 23b and end values 22b, 23b of a setting parameter 22, 23 are equal to one another, then the one or the several actuating elements 103, which are set and/or configured by means of the group switch command 20, are adjusted to the same value—in particular, their control variables. Alternatively or additionally, the group switching command 20 can comprise either only a start value 22*a*, 23*a* or end value 22*a*, 22*b* for a setting parameter 22, 23, wherein the one actuating element 103 or the several actuating elements 103 are then set and/or configured with the start value 22*a*, 23*a* or end value 22*b*, 23*b*.

If the start value 22*a*, 23*a* differs from the respective end value 22*b*, 23*b* of a setting parameter 22, 23, an actuating element 103 having a first identifier X1-X44 is set and/or configured using the start value 22*a*, 23*a*, and an actuating element 103 having a second identifier X1-X44 is set and/or configured using the end value 22*b*, 23*b*.

Furthermore, the control and/or regulating system 200—in particular, the computer unit and/or control unit—is configured to determine, for a respective setting parameter 22, 23, an intermediate value or several intermediate values as a function of the start and end values 22*a*-23*b*. Thus, an actuating element 103 or several actuating elements 103 having an identifier X1-X44 lying between the first and second identifier 21*a*, 21*b* can be set and/or configured using the one intermediate value or the several intermediate values. In this case, the intermediate value or the intermediate values of a group switching command 20—in particular, a setting parameter 22, 23—is/are calculated by means of linear interpolation. In this case, however, alternatively or additionally, other calculation methods, e.g., nearest-neighbor, square, or cubic interpolation, are also conceivable.

In the case of the actuating elements 103 shown in FIG. 3 through FIG. 6—in particular, spray nozzles 104 and/or valves—the amount of material spread thereby—in particular, spraying medium—can be set individually—in particular, in a partial-surface-specific manner—wherein FIG. 3 through FIG. 6 show different settings and/or configurations of the individual actuating elements 103. In this case, the group switching commands 20 comprise a setting parameter 22, 23—in particular, a start and/or end value 22*a*-23*b*—influencing the pressure and/or the amount of the material—in particular, within the conveying system and/or the actuating element 103.

Figure 3:
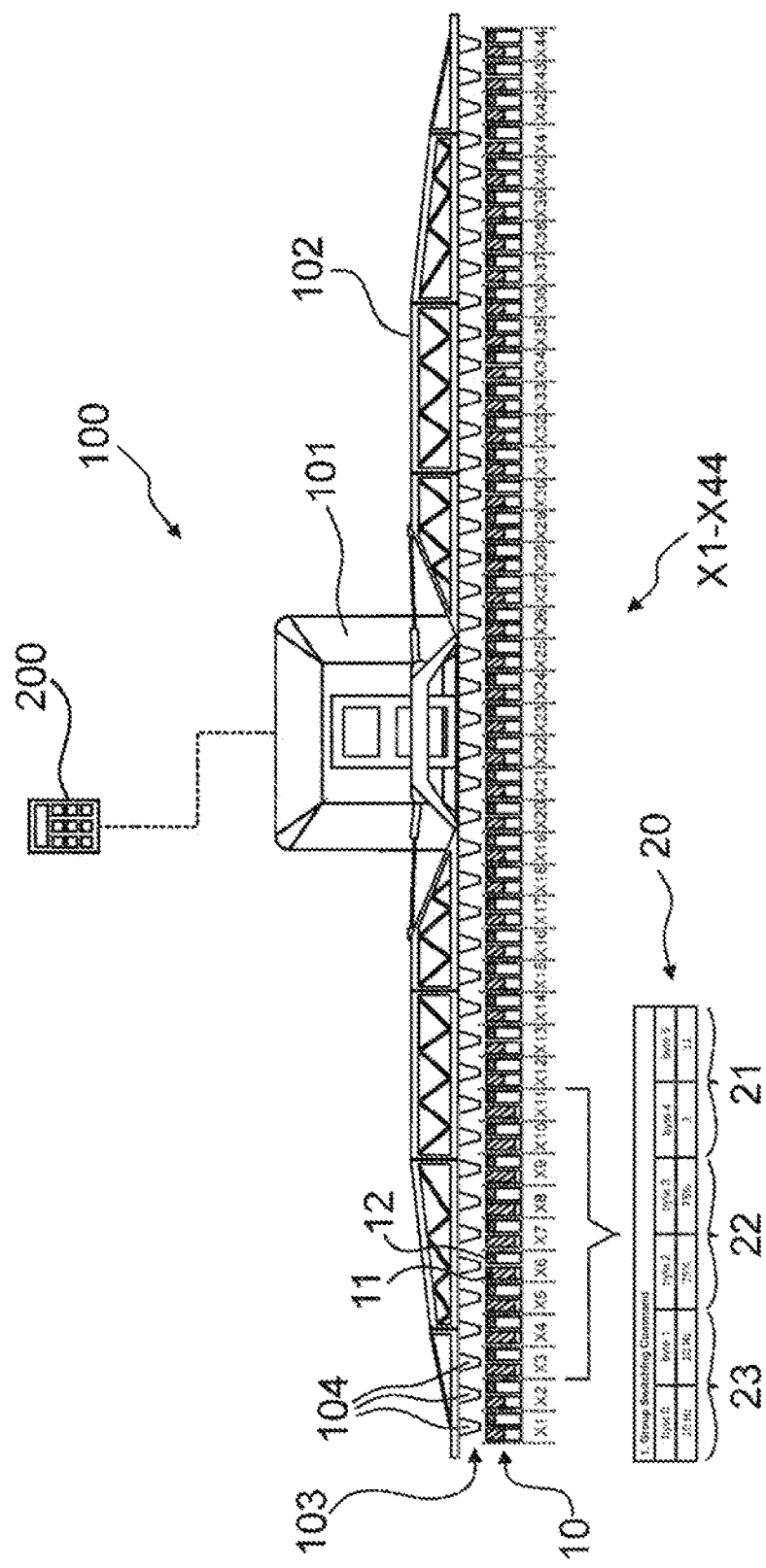
FIG. 3 shows the agricultural field sprayer having a first adjusted setting and/or configuration of actuating elements.
Figure 4:
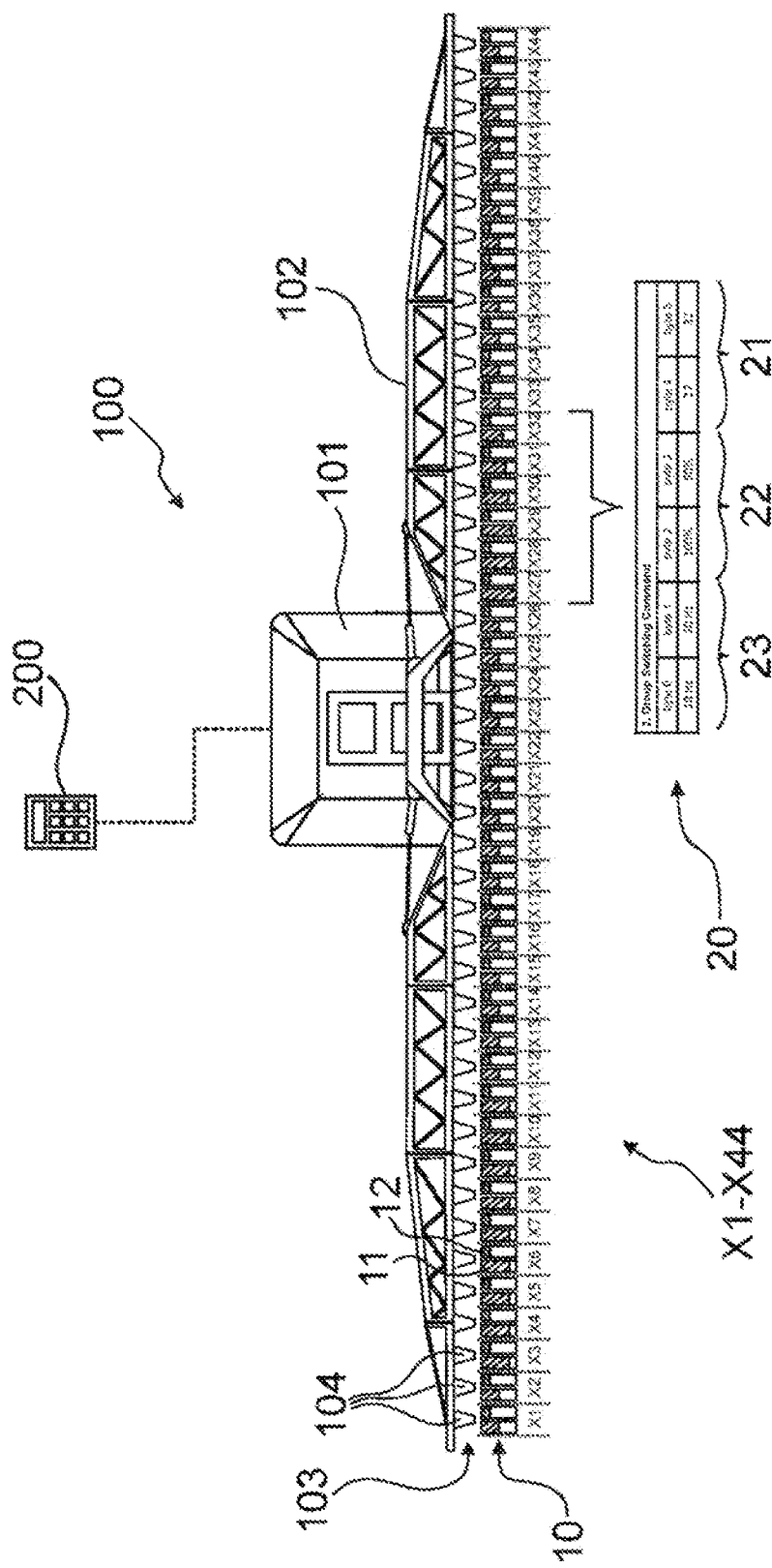
FIG. 4 shows the agricultural field sprayer having a second adjusted setting and/or configuration of actuating elements.
Figure 5:
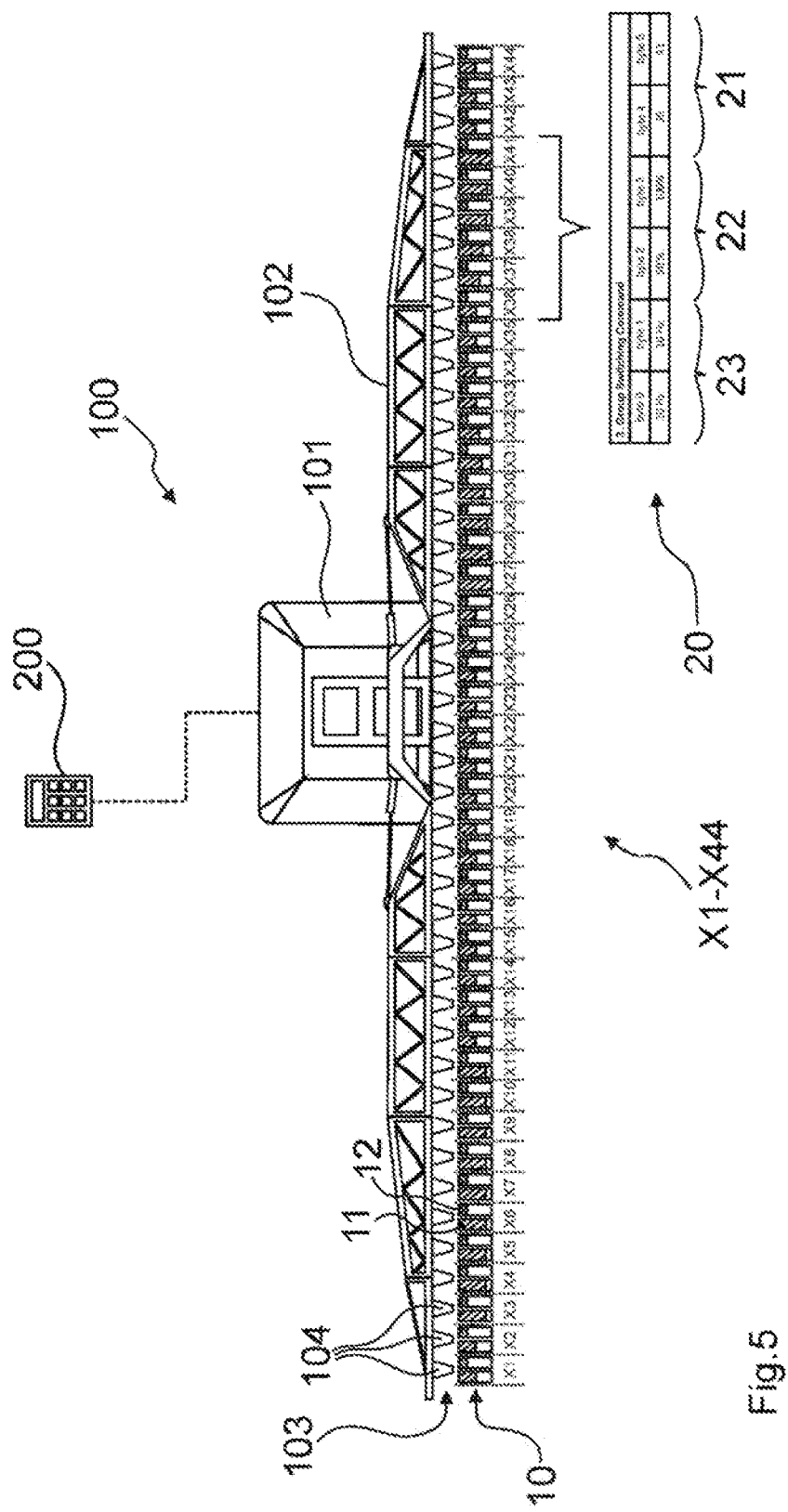
FIG. 5 shows the agricultural field sprayer having a third adjusted setting and/or configuration of actuating elements.
Figure 6:
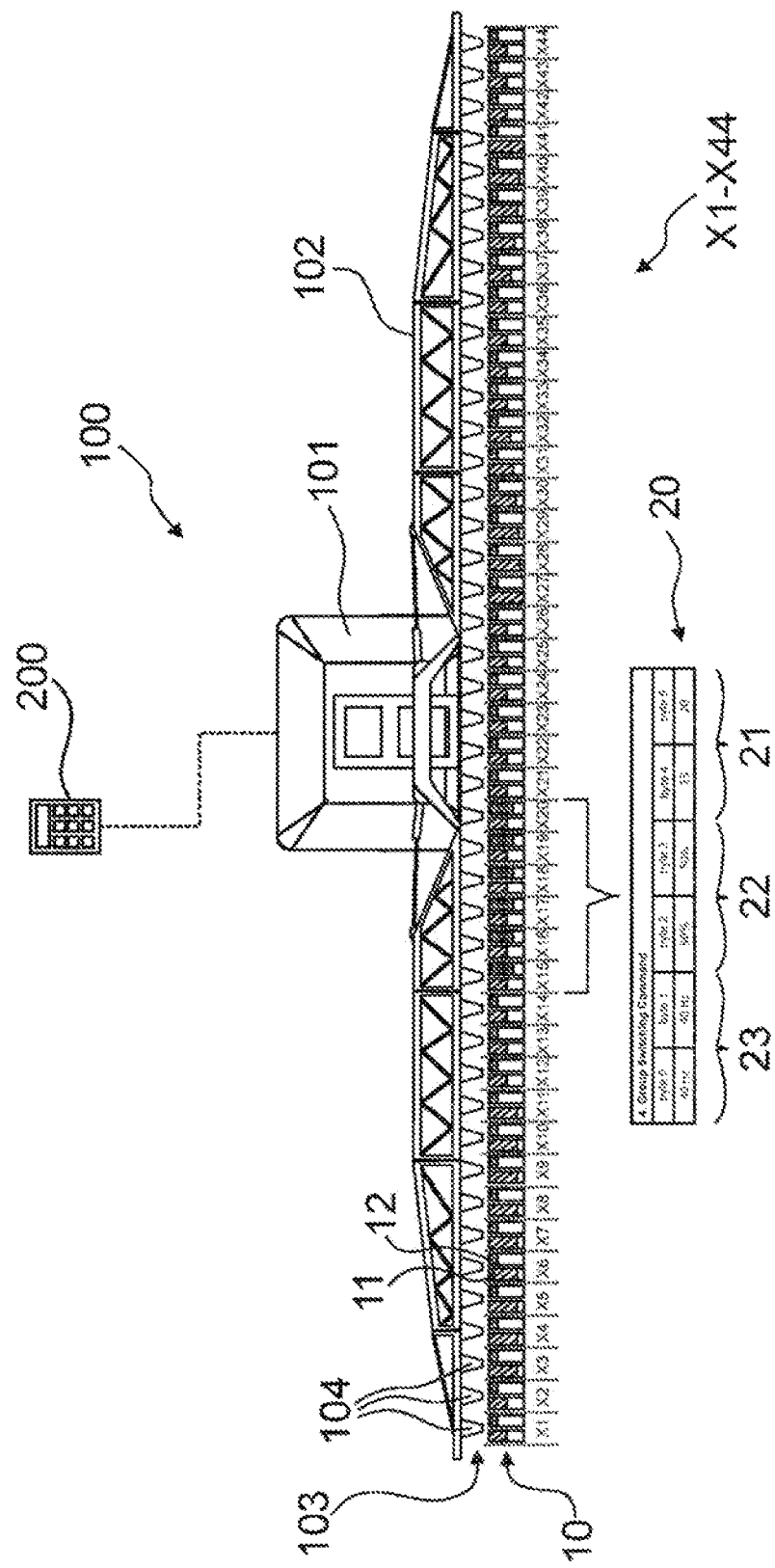
FIG. 6 shows the agricultural field sprayer having a fourth adjusted setting and/or configuration of actuating elements.

FIG. 3 shows a first group switching command 20 which comprises a first and second duty cycle 22*a*, 22*b* having the value 75%, and a first and second pulse frequency 23*a*, 23*b* having the value 10 Hz. In this case, the first identifier 21*a* is set to X3 and the second identifier 21*b* to X11, such that the group switching command 20 is associated in this case, by the control and/or regulating system 200—in particular, the control unit—with the actuating elements 103 having the identifiers X3-X11. Thus, the actuating elements 103 having the identifiers X3-X11—in particular, their control variables—are set and/or configured to a duty cycle of 75% and a pulse frequency of 10 Hz, while the remaining actuating elements 103 remain in the original setting or original configuration having a duty cycle of 50% and a pulse frequency of 10 Hz. Thus, in this case, the spreading rate of the material—in particular, spraying medium—is increased in the case of the actuating elements 103 having the identifiers X3-X11 relative to the other actuating elements 103.

The second group switching command 20 retrieved and/or generated in FIG. 4 by the control and/or regulating system 200—in particular, the computer unit—comprises a first setting parameter 22 having a start value 22*a*—in particular, first duty cycle—of 100%, and an end value 22*b*—in particular, second duty cycle—of 50%. Furthermore, the second group switching command 20 comprises a first identifier 21*a* having X27 and a second identifier 21*b* having X32. Thus, in this embodiment, the duty cycle of the actuating element 103 having the identifier X27 is adjusted to 100%, and the duty cycle of the actuating element 103 having the identifier X32 is adjusted to 50%. The actuating element 103 having the identifier X27 thus has a higher spreading rate of the material—in particular, a spraying medium—than the actuating element 103 having the identifier X32. In this case, the respective duty cycle of the actuating elements 103 having the identifiers X28 through X31 is adjusted to an intermediate value interpolated by the control and/or regulating system 200—in particular, by the computer unit and/or control unit. In the case, as shown in this embodiment, of a higher start value 22*a*—in particular, first duty cycle—compared to the end value 22*b*—in particular, second duty cycle—the intermediate values are associated with the actuating elements having an identifier X1-X44 lying between the first and second identifiers 21*a*, 21*b*, in increasing order of the identifiers X1-X44, wherein the magnitude of the intermediate values is designed to increase in this case.

The third group switching command 20 retrieved and/or generated in FIG. 5 by the control and/or regulating system 200—in particular, the computer unit—comprises a first setting parameter 22 having a start value 22*a*—in particular, first duty cycle—of 50% and an end value 22*b*—in particular, second duty cycle—of 100%. Furthermore, the second group switching command 20 comprises a first identifier 21*a* having X36 and a second identifier 21*b* having X41. Thus, in this embodiment, the duty cycle of the actuating element 103 having the identifier X36 is adjusted to 50%, and the duty cycle of the actuating element 103 having the identifier X41 is adjusted to 100%. The actuating element 103 having the identifier X36 thus has a lower spreading rate of the material—in particular, a spraying medium—than the actuating element 103 having the identifier X41. In this case, the respective duty cycle of the actuating elements 103 having the identifiers X37 through X40 is adjusted to an intermediate value interpolated by the control and/or regulating system 200—in particular, by the computer unit and/or control unit. In the case, as shown in this embodiment, of a smaller start value 22*a*—in particular, first duty cycle—compared to the end value 22*b*—in particular, second duty cycle—the intermediate values of the actuating elements 103 are associated with an identifier X1-X44 lying between the first and second identifiers 21*a*, 21*b* in increasing order of the identifiers X1-X44, wherein the magnitude of the intermediate values is designed to increase in this case.

FIG. 6 shows an embodiment in which a fourth group switching command 20 is retrieved and/or generated and transmitted by the control and/or regulating system 200—in particular, the computer unit. In this case, the fourth group switching command 20 comprises a second setting parameter 23 having a start value 22*a* and end value 22*b*—in particular, a pulse frequency—of 40 Hz. Furthermore, the fourth group switching command 20 comprises a first identifier 21*a* having X15 and a second identifier 21*b* having X20. Thus, in this case, the respective pulse frequencies 12 of the actuating elements 103 having the identifiers X15 through X20 are adjusted—in particular, set and/or configured—to 40 Hz. The frequency of the opening or closing processes of the actuating elements 103 controlled here is thus increased relative to the other actuating elements 103.

According to the invention, the adjusted settings and/or parameters of a respective actuating element 103—in particular, a spray nozzle 104 and/or a valve—are maintained until they are re-adjusted by a subsequent group switching command 20.

Alternatively or additionally, it is also conceivable to temporally limit the adjustment of settings and/or parameters of a respective actuating element 103. After expiration of the thus predeterminable time, the settings and/or parameters of a respective actuating element 103 are thus again adjusted to the original setting and/or configuration.

Figure 7:
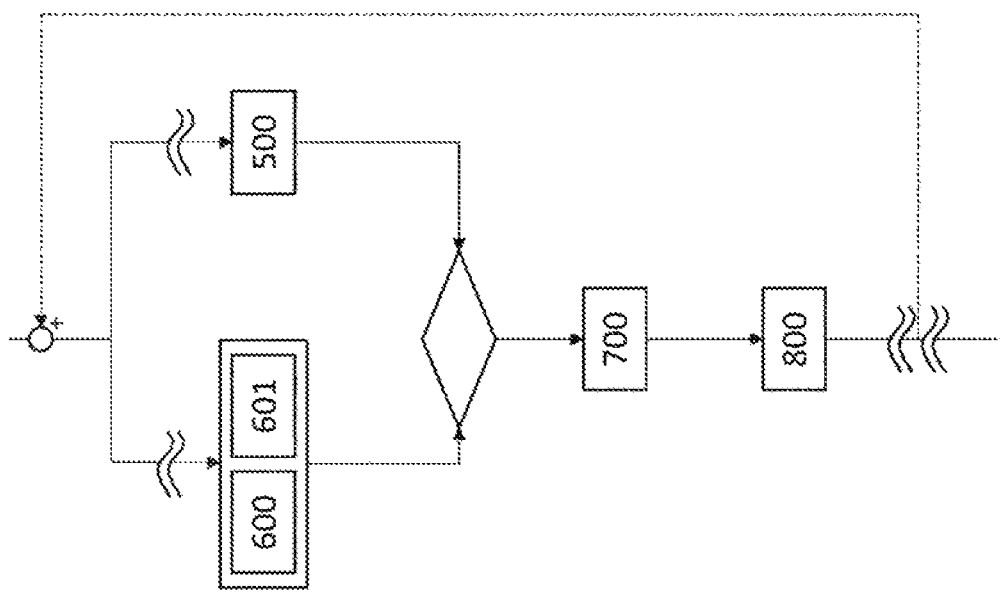
FIG. 7 shows a flowchart of a method according to the invention for operating an agricultural working machine.

FIG. 7 shows a flowchart, by way of example, of a method for operating an agricultural working machine 100 according to the invention having a control and/or regulating system 200.

Following the initiation of the method, at least one of the following steps is carried out:

500) generating and/or retrieving the at least one group switching command 20 provided for at least one actuating element 103; or 600) generating and/or retrieving switching commands with setting parameters 22, 23 suitable for setting and/or configuring actuating elements 103; and 601) combining several switching commands provided for at least one actuating element 103 to form at least one common group switching command 20.

As soon as the group switching command 20 is generated and/or retrieved, or combined from several switching commands, the following step is initiated:

700) transmitting and/or receiving the at least one group switching command 20 by means of the at least one control unit.

As soon as the group switching command 20 is received and/or transmitted by the control unit, the following step is performed:

800) adjusting at least one setting and/or a parameter of at least one actuating element 103—preferably several actuating elements 103—using the at least one group switching command 20.

All the steps described above can be repeated constantly during the processing operation.

LIST OF REFERENCE SYMBOLS

10 Visualization of adjusted settings and/or parameters
11 Left-hand bar, set pulse width, set duty cycle
12 Right-hand bar, set pulse frequency
20 Group switching command
21 Identifier of the group switching command
21a First identifier
21b Second identifier
22 First setting parameter
22a Start value, first duty cycle
22b End value, second duty cycle
23 Second setting parameter
23a Start value, first pulse frequency
23b End value, second pulse frequency
100 Agricultural working machine, field sprayer
101 Storage container
102 Linkage
103 Actuating element
104 Spray nozzle
200 Control and/or regulating system
F Direction of travel
X1-X44 Identifiers of the actuating elements
Z Tractor

The invention claimed is:

1. A control or regulating system for an agricultural working machine comprising:
   a plurality of actuating elements which are controllable individually or in groups,
   at least one control unit associated with the actuating elements, wherein the control unit is configured to at least one of receive and send switching commands for controlling the actuating elements, wherein the switching commands have at least one setting parameter for at least one of setting and configuring the actuating elements, and
   at least one signal line configured to connect at least two of the actuating elements to the control unit for signal transmission,
   wherein the switching commands are combinable to form at least one common group switching command that is transmittable by way of the at least one signal line, and in that the actuating elements are configured to be at least one of settable and configurable by means of the at least one common group switching command,
   the at least one common group switching command comprises at least one of a first and second identifier associated with respective actuating elements, wherein at least one of the actuating elements having an identifier matching at least one of the first and second identifier or lying between the first and second identifier is configured to be at least one of settable and configurable using the at least one common group switching command,
   the at least one common group switching command comprises at least one setting parameter having at least one of a start and end value, wherein at least one actuating element having at least one of the first and second identifier is configured to be at least one of settable and configurable using at least one of the start value and end value,
   wherein the control unit is configured to control the plurality of actuating elements using the at least one common group switching command.

2. The control or regulating system according to claim 1, wherein the control or regulating system is a bus system.

3. The control or regulating system according to claim 2, wherein the bus system is a CAN bus system.

4. The control or regulating system according to claim 1, wherein the at least one common group switching command provided for the at least two actuating elements comprises the at least one setting parameter having the start and end value, wherein the actuating element of the at least two actuating elements having the first identifier is configured to be at least one of settable and configurable using the start value, and the actuating element of the at least two actuating elements having the second identifier is configured to be at least one of settable and configurable using the end value.

5. The control or regulating system according to claim 1, wherein the at least one actuating element having the identifier lying between the first and second identifier is configured to be at least one of settable and configurable using at least one intermediate value lying between the start and end value.

6. The control or regulating system according to claim 1, wherein the actuating elements are controllable using at least one of a pulse width modulation and pulse width frequency modulation.

7. The control or regulating system according to claim 6, wherein the at least one common group switching command comprises at least one of a pulse width and pulse frequency.

8. The control or regulating system according to claim 7, wherein the at least one setting parameter comprises at least one of the pulse width and pulse frequency.

9. The control or regulating system according to claim 7, wherein the at least one common group switching command comprises at least one of a range of the pulse width and pulse frequency.

10. The control or regulating system according to claim 1, wherein the agricultural working machine is a distribution machine for spreading material over an agricultural area.

11. An agricultural working machine having a control or regulating system, the control or regulating system comprising:
- a plurality of actuating elements which are controllable individually or in groups,
- at least one control unit associated with the actuating elements, wherein the control unit is configured to at least one of receive and send switching commands for controlling the actuating elements, wherein the switching commands have at least one setting parameter for at least one of setting and configuring the actuating elements, and
- at least one signal line configured to connect at least two of the actuating elements to the control unit for signal transmission,
- wherein the switching commands are combinable to form at least one common group switching command that is transmittable by way of the at least one signal line, and in that the actuating elements are configured to be at least one of settable and configurable by means of the at least one common group switching command,
- the at least one common group switching command comprises at least one of a first and second identifier associated with respective actuating elements, wherein at least one of the actuating elements having an identifier matching at least one of the first and second identifier or lying between the first and second identifier is configured to be at least one of settable and configurable using the at least one common group switching command,
- the at least one common group switching command comprises at least one setting parameter having at least one of a start and end value, wherein at least one actuating element having at least one of the first and second identifier is configured to be at least one of settable and configurable using at least one of the start value and end value,
- wherein the control unit is configured to control the plurality of actuating elements using the at least one common group switching command.

12. The agricultural working machine according to claim 11, wherein the working machine is configured as a towed, carried, or self-propelled field sprayer for spreading spraying medium, comprising:
- at least one storage container for storing the spraying medium,
- a linkage extending transversely to a direction of travel,
- at least one of spray nozzles, the spray nozzles arranged on the linkage, and valves associated with the spray nozzles for spreading the spray medium, and
- a conveying system, configured to supply the spraying medium to at least one of the valves and spray nozzles from the at least one storage container in at least one of an adjustable amount and at an adjustable pressure.

13. The agricultural working machine according to claim 12, wherein an amount of spraying medium spread by at least one of the spray nozzles and valves are settable individually, wherein the at least one common group switching command comprises the at least one setting parameter influencing at least one of a pressure and the amount of the spraying medium.

14. The agricultural working machine according to claim 12, wherein the valves are solenoid valves.

15. The agricultural working machine according to claim 12, wherein the amount of spraying medium spread by at least one of the spray nozzles and valves are settable in a partial-surface-specific manner.

16. A method for operating an agricultural working machine having a control or regulating system, the control or regulating system comprising: a plurality of actuating elements which are controllable individually or in groups, at least one control unit associated with the actuating elements, wherein the control unit is configured to at least one of receive and send switching commands for controlling the actuating elements, wherein the switching commands have at least one setting parameter for at least one of setting and configuring the actuating elements, and at least one signal line configured to connect at least two of the actuating elements to the control unit for signal transmission, wherein the switching commands are combinable to form at least one common group switching command that is transmittable by way of the at least one signal line, and in that the actuating elements are configured to be at least one of settable and configurable by means of the at least one common group switching command, the at least one common group switching command comprises at least one of a first and second identifier associated with respective actuating elements, wherein at least one of the actuating elements having an identifier matching at least one of the first and second identifier or lying between the first and second identifier is configured to be at least one of settable and configurable using the at least one common group switching command, the at least one common group switching command comprises at least one setting parameter having at least one of a start and end value, wherein at least one actuating element having at least one of the first and second identifier is configured to be at least one of settable and configurable using at least one of the start value and end value,
- wherein the method comprises controlling the plurality of actuating elements using the at least one common group switching command.

* * * * *